United States Patent [19]
Huster et al.

[11] Patent Number: 5,311,738
[45] Date of Patent: May 17, 1994

[54] EXHAUST GAS DUCT FOR A ROW OF CYLINDERS OF AN INTERNAL COMBUSTION ENGINE

[75] Inventors: Joachim Huster, Friedrichshafen; Hermann Baumann, Tettnang, both of Fed. Rep. of Germany

[73] Assignee: MTU Motoren- und Turbinen- Union Friedrichshafen GmbH, Friedrichshafen, Fed. Rep. of Germany

[21] Appl. No.: 21,162

[22] Filed: Feb. 22, 1993

[30] Foreign Application Priority Data

Feb. 28, 1992 [DE] Fed. Rep. of Germany ....... 4206247

[51] Int. Cl.⁵ .............................................. F01N 7/10
[52] U.S. Cl. ........................................ 60/321; 60/322; 60/323
[58] Field of Search .......................... 60/321, 323, 322

[56] References Cited

U.S. PATENT DOCUMENTS

| | | | |
|---|---|---|---|
| 3,653,205 | 4/1972 | Tadokoro | 60/322 |
| 4,179,884 | 12/1979 | Koeslin | 60/321 |
| 4,463,709 | 8/1984 | Pluequet | 60/321 |
| 4,658,580 | 4/1987 | Schley | 60/322 |

FOREIGN PATENT DOCUMENTS 2744964 4/1979 Fed. Rep. of Germany .

*Primary Examiner*—Douglas Hart
*Attorney, Agent, or Firm*—W. G. Fasse; W. F. Fasse

[57] ABSTRACT

An exhaust gas duct for a row of a plurality of combustion engine cylinders has an exhaust pipe section extending alongside the cylinders and a cooling housing in which the exhaust pipe section is mounted. The cooling housing has a middle longitudinal section and two end sections, one of which is a cover and the other is a mounting connector duct end ring. The middle section has substantially circular end portions with cooling liquid flow ducts therein and a flange portion for mounting to a cylinder head. The middle section is made of extruded standardized stock of light metal which facilitates the manufacture and assembly of the duct. A compact structural volume is also achieved thereby. The extruded stock material assures a good dimensional accuracy, a high surface quality, and good sealing characteristics.

10 Claims, 2 Drawing Sheets ically-shaped. The term "substantially circularly-shaped" is intended to include cross-section shapes that deviate somewhat from a perfect circular cross-section. Such deviations may, for example,
EXHAUST GAS DUCT FOR A ROW OF CYLINDERS OF AN INTERNAL COMBUSTION ENGINE

CROSS-REFERENCE TO RELATED APPLICATION

The present application relates to my copending application U.S. Ser. No. 08/021,166; filed on Feb. 22, 1993, entitled: EXHAUST GAS DUCT FOR A ROW OF CYLINDERS OF AN INTERNAL COMBUSTION ENGINE.

FIELD OF THE INVENTION

The invention relates to an exhaust gas duct for a row of cylinders in an internal combustion engine, wherein a water cooled housing surrounds a gas guide channel with an air gap between the channel and the housing.

BACKGROUND INFORMATION

In exhaust gas ducts of this type the liquid cooled housing extends along the entire length of the row of cylinders, preferably in one piece. Such a cooling housing is provided with several longitudinal chambers for the cooling liquid and these chambers are separated from each other by intermediate walls. The cooling housing is also provided with exhaust gas passages through which exhaust gas from the cylinders passes into the gas guide channel. The just described conventional construction does not remove much heat from the exhaust gas on its way from the cylinder to a super charger. Such a feature is desirable because it supplies a higher energy potential to the super charger. However, it is necessary that the temperature on the outer surface of the exhaust gas duct is lowered into the range of the cooling liquid temperature of the internal combustion engine in order to satisfy operational requirements for such engines that are intended to run without monitoring. Thus, an efficient cooling of the engine components next to the exhaust duct is necessary without unnecessarily reducing the exhaust gas temperature. German Patent Publication DE 2,744,964 A1(Pluequet, Heinz), published on Apr. 19, 1979, discloses an exhaust gas duct construction of the type described above in which the water cooled housing is constructed of a semi-finished product of light metal in such a way that the entire structure has a substantial volume due to the large dead spaces between the housing and the exhaust gas guide channel. The provision of large dead spaces in the cooling housing of an exhaust gas duct militates against a compact construction, not only of the exhaust gas duct with its cooling housing, but also of the internal combustion engine. Furthermore, the known construction is quite involved in its mounting and demounting, because the gas guide channel and its cooling housing must be separately secured to the engine block and accordingly, they must be separately removed from the engine block.

OBJECTS OF THE INVENTION

In view of the above it is the aim of the invention to achieve the following objects singly or in combination:

to construct and exhaust gas duct and its cooling housing for an internal combustion engine in a compact manner thereby using an extruded semi-finished product of light metal for making the water cooled housing;

to optimally reduce the volume of the water cooled housing while still maintaining an adequate insulating gap between the cooling housing and the gas guide channel or pipe section;

to construct the exhaust gas duct and its water cooled housing so that the guide channel is mounted in the housing, whereby assembly and mounting steps are simplified and costs thus reduced; and to use a semi-finished, extruded standardized sectional stock that assures the required dimensional precision, a high surface quality, as well as the required sealing ability of the housing to avoid leaks of cooling liquid.

SUMMARY OF THE INVENTION

The above objects have been achieved according to the invention by an exhaust gas duct construction in which the water cooling housing is made of an elongated central section and two end sections, whereby the elongated section comprises two portions, namely a first portion with an approximately circular cross-section and a second portion forming an elongated flange along the first portion for securing the cooling housing to a cylinder block. The exhaust gas guide channel is an undivided pipe section extending along the entire length of the cylinder row, wherein the flange portion of the cooling housing also extends along the cylinder block for mounting. An intermediate wall that separates two longitudinal cooling channels in the cooling housing and that extends toward the flange portion and alongside the flange portion, is wider than gas flow passages through this intermediate wall to connect the cylinder exhaust ports to the exhaust gas pipe section. One of the housing end sections forms a cover. The other end section forms a connector end ring. Both the cover and the end ring are provided with flow ducts for the cooling liquid and with mounting shoulders for the gas exhaust channel or pipe section. Advantages of the invention reside particularly in the fact that the cross-sectional configuration of the cooling housing with a substantially circular portion and a flange portion is rather suitable for producing a semi-finished product for making the housing as an extruded, elongated sectional stock. Such extruded sectional stock can be produced with a high dimensional precision, with a high surface quality, and with a respective good sealing ability of the housing. Furthermore, such a semi-finished extruded sectional stock requires but a few simple machining operations for producing the main housing section which in turn substantially reduces the manufacturing costs. More specifically, any number of cylinders in a row can be accommodated by the housing construction according to the invention simply by cutting-off the required length from an extruded sectional semi-finished product. Thus, standardized length of semi-finished sections may be kept in stock which substantially reduces the cost for maintaining supplies. Further, this construction according to the invention results in a compact, low structural volume for the exhaust duct cooling housing, and the mounting and supply costs can be further reduced by a preassembly of the housing and the exhaust gas channel with the end cover and the end mounting ring sections.

BRIEF DESCRIPTION OF THE DRAWINGS

In order that the invention may be clearly understood, it will now be described, by way of example, with reference to the accompanying drawings, wherein.

DETAILED DESCRIPTION OF A PREFERRED EXAMPLE EMBODIMENT AND OF THE BEST MODE OF THE INVENTION

Figure 1:
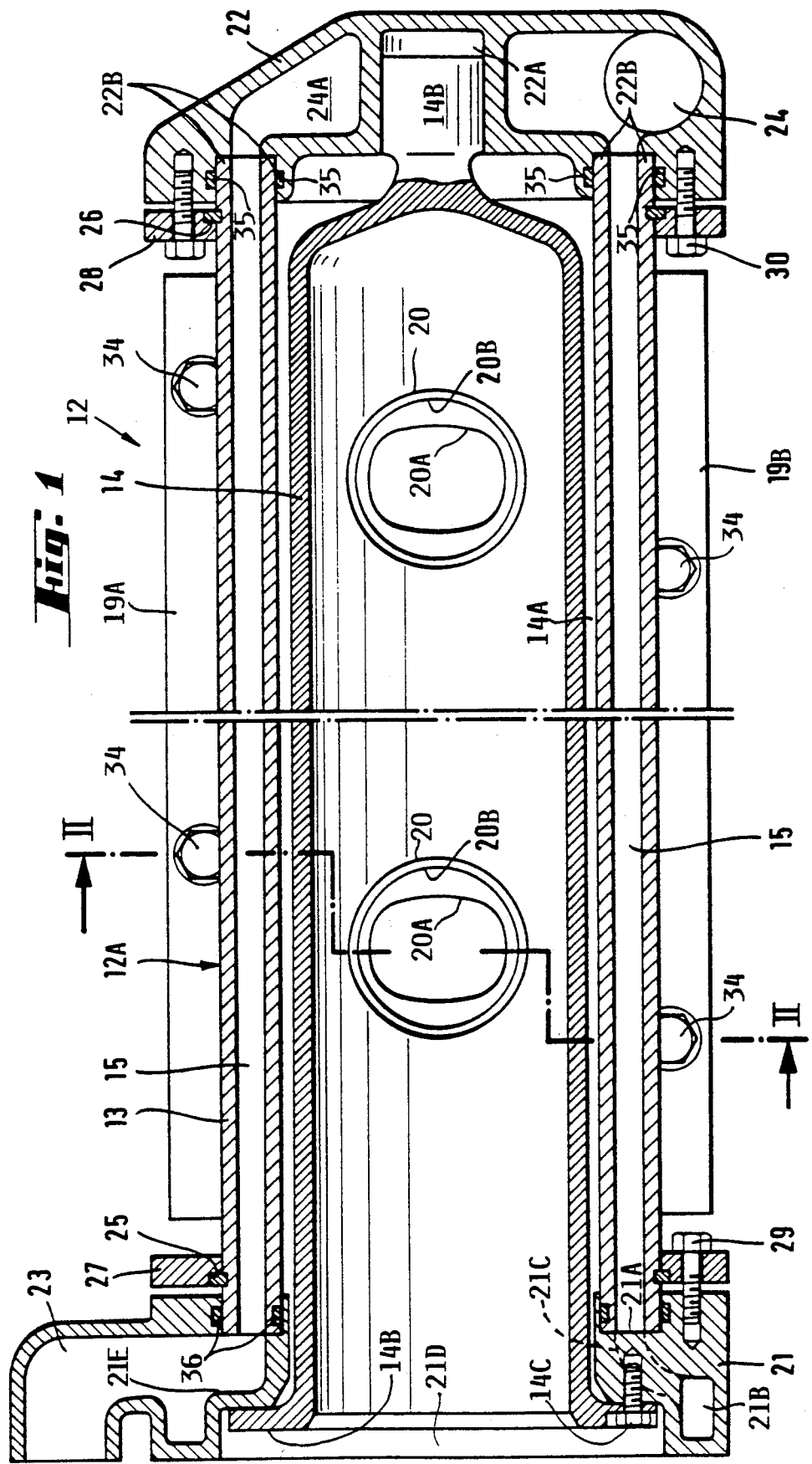
FIG. 1 is a longitudinal section through an exhaust duct construction according to the invention along section I—I in FIG. 2.

Referring to both figures in conjunction, a cylinder block 11 of an internal combustion engine holds a plurality of cylinders arranged in a row. Only the cylinder exhaust ports 20A are shown. Two such ports 20A are visible in FIG. 1. The exhaust gas duct structure 12 comprises a cooling housing 12A constructed according to the invention of extruded sectional stock and an exhaust gas pipe section 14 centrally mounted in the cooling housing 12A. The cooling housing 12A comprises an undivided integral longitudinal central portion 13 and a flange portion 19 extending integrally at least along part of the central portion 13. The housing 12A further comprises an end section as a closure cover 22 and an end mounting ring 21. The exhaust gas pipe section 14 is concentrically mounted in the housing portion 13 so as to form an air insulating gap 14A between the pipe section 14 and the inner wall of the housing portion 13. The pipe section 14 also extends as a single piece component substantially along the entire length of the cylinder row.

The pipe section 14 has gas passages 20 along its length facing toward the cylinder head 11. Thus, these passages 20 communicate with the exhaust ports 20A in the cylinder head 11 and with the insulating gap 14A.

The central longitudinal housing portion 13 has longitudinal cooling liquid flow channels or chambers 15 separated by walls 18. Two similar longitudinal cooling liquid flow channels or chambers 16 are separated by a wider wall 17 of sufficient dimension so that interconnecting passages 20B between the exhaust ports 20A and the passages 20 can pass through these walls 17.

Figure 2:
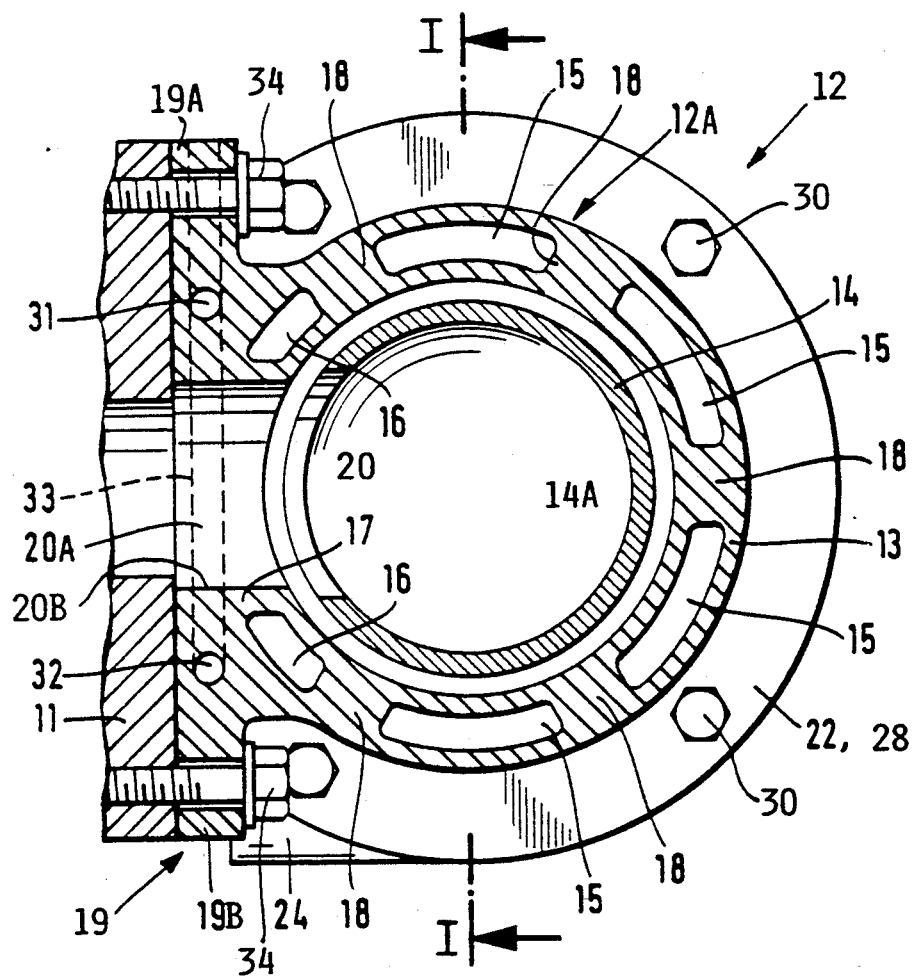
FIG. 2 is a cross-section along section line II—II in FIG. 1.

The above mentioned flange section 19 forms two webs 19A and 19B which extend approximately tangentially to the central housing portion 13 as best seen in FIG. 2. The flange section 19 extends with its webs 19A and 19B substantially along the entire length of the central housing portion 13, but is somewhat shorter than the central housing portion 13 to leave space for the mounting of the end ring 21 provided with a duct and the end cover 22. Screws 34 pass through the webs 19A and 19B for securing the flange section 19 to the cylinder head or block 11. The flange section is shortened relative to the length of the central housing portion 13 by a simple machining operation.

The cover 22 has a cooling liquid inlet 24 entering into a circular flow duct 24A communicating with the channels 15 and 16. The cover 22 has a central dead-end hole 22A in which a mounting stub 14B of the exhaust gas pipe section 14 is received. The cover 22 is further provided with shoulders 22B in which an end of the central housing portion is mounted. Sealing rings 35 seal the cover 22 to the end of the housing portion 13. A stop ring 26 is rigidly secured to the outer surface of the central housing portion 13 somewhat spaced from the end face of the housing portion 13 to hold a mounting ring 28. Preferably, the stop ring 26 has a rectangular crosssection which is partially received in an outer circumferential groove of the housing portion 13 to properly hold the mounting ring 28 against axial displacement when screws 30 are used to secure the cover 22 in place to close one end of the cooling housing.

The end mounting ring 21 is of similar construction as the cover 22 with regard to the mounting of the ring 21 to the end of the housing portion 13 which reaches into a groove 21A of the ring 21 which is provided with a cooling liquid port 23 communicating with the channels 15 and 16. A channel 21B is a ring channel communicating with all the channels 15 and 16 and with the port 23 as indicated at 21C. Sealing rings 36 seal the housing portion 13 to the ring 21. A stop ring 25, preferably received in an outer circumferential groove in the housing portion 13 holds a mounting ring 27 to which the ring 21 is secured by screws 29. The mounting ring 21 has an exit port 21D surrounded by a shoulder 21E to which a radially outward flange 14B of the exhaust pipe section 14 is secured by screws 14C. The cylindrical machining at both ends of the housing portion 13 assures a concentric arrangement which maintains the gap 14A for insulating the pipe section 14 from the portion 13.

Once the central housing portion 13 has been severed from a length of standard stock as described above, its ends are machined and the passages 20 are bored, and the entire housing is then provided on its surface with a corrosion protection coating, for example, by anodizing the aluminum of the stock material to form an aluminum oxide layer. Since the extruded stock material has very smooth surfaces, such anodizing can be performed without any problems.

In a preferred embodiment, the mounting flange 19 is also provided with cooling liquid ducts 31, 32 which are interconnected by a cross-bore 33. The ducts 31 and 32 are formed as part of the extrusion process. These ducts 31 and 32 extend in parallel to the channels 16. Separate inlet and outlet ports of the ducts 31, 32 lead to a cooling liquid supply and these ports may be connected to the closure 22 and to the mounting end ring 21.

Although the invention has been described with reference to specific example embodiments it will be appreciated that it is intended to cover all modifications and equivalents within the scope of the appended claims.

What we claim is:

1. An exhaust gas duct for a row of cylinders of a combustion engine (11) comprising an exhaust gas pipe section (14) for extending alongside said row of cylinders, a cooling housing (13) wherein said exhaust gas pipe section is mounted, a gap (14A) between said cooling housing and said pipe section, said cooling housing comprising an elongated section and two end sections (21, 22) for closing said elongated section, said elongated section comprising an elongated portion (13A) with an approximately circular cross-section and a flange portion (19) forming, an integral unit with said elongated portion for mounting said exhaust gas duct (12) to said combustion engine (11), cooling liquid flow channels(15, 16) in said cooling housing, means (24A, 21B) for interconnecting said cooling liquid flow channels of said cooling housing, a longitudinal wall (17) in said cooling housing between said flange portion (19) and said elongated portion (13A), exhaust gas flow passages (20) through said flange portion (19), through said longitudinal wall (17), and through said exhaust gas pipe section (14), for passing exhaust gas from said cylinders (20A) into said pipe section (14), said end sections (21, 22) comprising means (22A, 21E) for mounting said pipe section (14) in said cooling housing.

2. The exhaust gas duct of claim 1, wherein said flange portion extends approximately tangentially to said elongated central housing portion.

3. The exhaust gas duct of claim 1, wherein said exhaust gas pipe section is a single piece pipe section having a closed end with a mounting stub (14B) and an open end with a mounting flange for mounting in said cooling housing.

4. The exhaust gas duct of claim 1, wherein said flange portion (19) of said elongated housing section has two further longitudinal cooling liquid flow channels (31, 32) arranged symmetrically to said longitudinal wall (17) and in parallel to said first mentioned cooling liquid flow channel (15, 16), said further flow channels (31, 32) being arranged on each side of said flow passages (20), and cross-bores (33) in said longitudinal wall for interconnecting said further cooling liquid flow channels (31, 32).

5. The exhaust gas conduit of claim 1, wherein said end sections (21, 22) comprise a cover section (22) and a mounting ring section, each of which comprises a port (24, 23) forming an inlet and outlet for cooling liquid.

6. The exhaust gas conduit of claim 1, wherein said longitudinal housing portion has ends machined cylindrically, each cylindrical end having a ring groove therein, said conduit further comprising a mounting stop ring in each ring groove for holding the respective end section, each mounting ring and groove having a rectangular cross-section.

7. The exhaust gas conduit of claim 6, further comprising a loose ring flange for securing the respective end section on the cylindrical end of said cooling housing, said loose ring flange being held in place by said mounting stop ring having a rectangular cross-section.

8. The exhaust gas duct of claim 1, wherein said elongated housing section is a standardized extrusion sectional stock material.

9. The exhaust gas conduit of claim 1, wherein said cooling housing including said end sections are made of light metal comprising an anodized oxide layer as a corrosion protection surface coating.

10. The exhaust gas conduit of claim 1, wherein said means (24A, 24B) interconnecting said cooling flow channels of said cooling housing comprise ducts in said housing end sections.

* * * * *